United States Patent [19]

Sato et al.

[11] Patent Number: 4,943,681

[45] Date of Patent: Jul. 24, 1990

[54] OPTICAL RECORDING MEDIUM AND PROCESS FOR THE PRODUCTION THEREOF

[75] Inventors: Takeshi Sato; Shuji Miyazaki; Makoto Sakamoto; Motonori Ando, all of Tokyo, Japan

[73] Assignee: Toyo Ink Manufacturing Co., Ltd., Tokyo, Japan

[21] Appl. No.: 454,953

[22] Filed: Dec. 22, 1989

[30] Foreign Application Priority Data

Dec. 29, 1988 [JP] Japan ............................... 63-334796
Mar. 9, 1989 [JP] Japan ............................... 64-57363
Sep. 26, 1989 [JP] Japan ............................... 64-250173

[51] Int. Cl.$^5$ .............................................. G03C 1/72
[52] U.S. Cl. .................................. 430/495; 430/945; 430/270; 428/64; 346/135.1; 540/128; 540/140
[58] Field of Search ................... 430/495, 270, 945; 428/64, 411.1, 500; 346/135.1; 369/284; 540/128, 140

[56] References Cited

U.S. PATENT DOCUMENTS 4,382,033 5/1983 Regan ............................ 260/245.74
4,725,525 2/1988 Kenney et al. ...................... 430/270

FOREIGN PATENT DOCUMENTS 201651 8/1986 Japan .
215928 9/1986 Japan .

Primary Examiner—Paul R. Michl
Assistant Examiner—Ashley Pezzner
Attorney, Agent, or Firm—Wenderoth, Lind & Ponack

[57] ABSTRACT

An optical recording medium which comprises an organic thin film layer containing at least one of phthalocyanine compounds, due to which high light absorptivity to laser beams and high recording sensitivity can be obtained. The optical recording medium provided by the present invention has high chemical and physical stability. There is also disclosed a process for the production of the optical recording medium.

18 Claims, No Drawings

OPTICAL RECORDING MEDIUM AND PROCESS FOR THE PRODUCTION THEREOF

FIELD OF THE INVENTION

The present invention relates to an optical recording medium which permits writing and reading of information with laser beams, and a process for the production of the optical recording medium.

PRIOR ART OF THE INVENTION

There have been conventionally well known a variety of optical recording media which use laser beams to write and read information. One type of the media uses laser beams to record information, in which a recording layer formed on a substrate is irradiated with the laser beam to cause melting, evaporation, decomposition, etc., on the irradiated part of the layer.

The above-type optical recording media have used, as a recording layer, a thin film of a metal such as As, Te, Se, Ti, or the ike, or a thin film of their alloy. In general, the optical recording media using one of these metals or their alloy as a recording layer have characteristics that they have high writing sensitivity and permit application of semiconductor lasers of which the write and read optical system can be decreased in size. Due to high thermal conductivity, etc., however, they have a defect that the energy of the laser beam cannot be effectively used at the writing time. Further, the recording layers of these media sometimes have been chemically unstable or deteriorated.

For this reason, Japanese Laid-Open patent Publications Nos. 82093/1982, 56892/1983, 89842/1985, 150243/1985, etc., have proposed optical recording media using an organic thin film as a recording layer, in which information writing and reading are effected by using a laser beam having a comparatively longer wavelength, e.g. 780 nm. In these recording media, very small concave parts (pits) can be formed on the organic thin film by melting, evaporation, decomposition, etc., by using a semiconductor laser of which the write and read optical system can be decreased. However, these media have a defect that their recording sensitivity is not sufficient since they have low light absorptivity to semiconductor laser beams.

A transparent glass substrate has been sometimes used as a substrate. However, resin substrates being free from crack from impact and having light weight have been desired, and above all, a polycarbonate substrate which can be produced at low costs and is highly reliable has been desired for commercial use. A major quantity of the recording films have been formed mainly of Te. However, this material requires high production costs, and for this reason, there have been recently an increasing number of proposals and reports for media using, in recording films, materials composed mainly of organic dyestuffs. Many materials using a cyanine dye as an organic dyestuff have been reported. Under the present situation, however, they have poor light-fastness and low reliability for long-term use. As compared with the cyanine dye, phthalocyanine dyestuffs have good light-fastness and high reliability for record storage. However, they generally have low solubility in solvents, and many of those into which soluble groups are introduced are soluble only in halogen or ketone solvents, etc., which have risk of corroding resin substrates. Thus, before these phthalocyanine dyestuffs are coated on a substrate, a treatment procedure is required which gives solvent resistance of the substrate by forming photopolymer guide grooves on the substrate. At present, there has been desired a technique thereby to permit coating of the phthalocyanine dyestuffs, which are highly reliable for record storage among organic dyestuffs, directly on a low-priced polycarbonate substrate by spin-coating, etc.

SUMMARY OF THE INVENTION

It is an object of the present invention to provide an optical recording medium having excellent energy efficiency and a process for the production thereof.

It is another object of the present invention to provide an optical recording medium having high light absorptivity to laser beams and high recording sensitivity, and a process for the production thereof.

It is further another object of the present invention to provide an optical recording medium having chemical and physical stability, and a process for the production thereof.

Further, it is another object of the present invention to provide an optical recording medium which can be formed without treatment of a resin substrate, a polycarbonate substrate in particular, for solvent resistance, and a process for the production thereof.

According to the present invention, there is provided an optical recording medium which comprises an organic thin film layer containing at least one of phthalocyanine-based compounds represented by the following general formula (I)

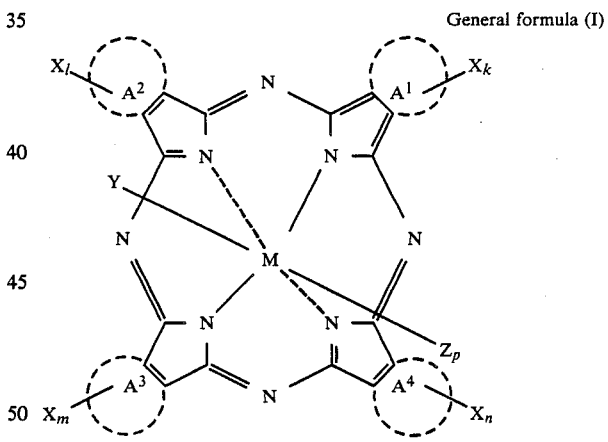

General formula (I)

wherein rings $A^1$ to $A^4$ each independently represent a benzene ring, naphthalene ring or anthracene ring, M represents Al, Ga, In, Si, Ge or Sn, X's may be identical or different, and each represents an alkyl group which may have a substituent, an aryl group which may have a substituent, a heteroring moiety which may have a substituent, a phthalimidomethyl group which may have a substituent, a halogen atom, a nitro group, cyano group, sulfonic acid group, $-OR^1$, $-SR^2$, $-COOR^3$,

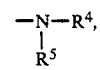

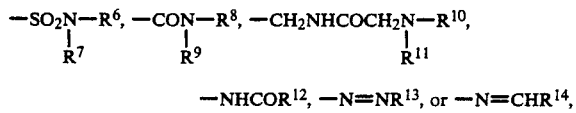

—NHCOR$^{12}$, —N=NR$^{13}$, or —N=CHR$^{14}$, in which R$^1$ to R$^{11}$ may be identical or different, and each represents a hydrogen atom or an alkyl group which may have a substituent, an aryl group which may have a substituent, an acyl group which may have a substituent, a cycloalkyl group which may have a substituent, or a polyether group which may have a substituent, or R$^6$ and R$^7$, R$^8$ and R$^9$ or R$^{10}$ and R$^{11}$ may form a four to seven-membered heteroring, and these four to seven-membered ring may further be a heteroring containing a nitrogen atom, oxygen atom or sulfur atom, R$^{12}$, R$^{13}$ and R$^{14}$ may be identical or different, and each represents an alkyl group which may have a substituent, a cylcoalkyl group which may have a substituent, or an aryl group which may have a substituent,

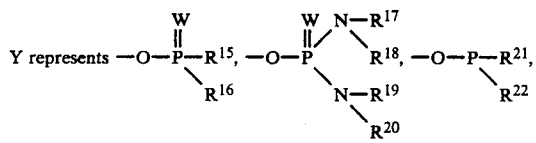

or —O—Se—R$^{23}$, and Z represents hydrogen, a halogen atom, a hydroxyl group, an alkyl group which may have a substituent,

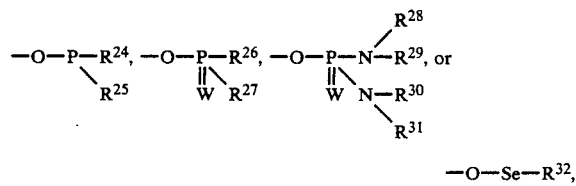

—O—Se—R$^{32}$, in which R$^{15}$, R$^{16}$, R$^{21}$, R$^{22}$, R$^{23}$, R$^{24}$, R$^{25}$, R$^{26}$, R$^{27}$ and R$^{32}$ may be identical or different, and each represents an alkyl group which may have a substituent, an aryl group which may have a substituent, an acyl group which may have a substituent, a cycloalkyl group which may have a substituent, an alkoxy group which may have a substituent, an aryloxy group which may have a substituent, a polyether group which may have a substituent, a hydroxyl group, or a halogen atom, and in which R$^{17}$, R$^{18}$, R$^{19}$, R$^{20}$, R$^{28}$, R$^{29}$, R$^{30}$ and R$^{31}$ may be identical or different and each represents an alkyl group which may have a substituent, an aryl group which may have a substituent, an acyl group which may have a substituent, a cycloalkyl group which may have a substituent, an alkoxy group which may have a substituent, an aryloxy group which may have a substituent, a polyether group which may have a substituent, a hydroxyl group, a halogen atom or a hydrogen atom, and W represents O, S, Se or Te, k, l, m and n each independently represent an integer of 0 to 8, and p represents 0 or 1.

DETAILED DESCRIPTION OF THE INVENTION

In the compounds of general formula (I) in the present invention, concerning X, examples of the alkyl group which may have a substituent include a methyl group, n-butyl group, tert-butyl group, stearyl group, trichloroethyl group, 2-methoxyethyl group, etc., examples of the aryl group which may have a substituent include a phenyl group, chlorophenyl group, tolyl group, naphthyl group, anthryl group, dimethylaminophenyl group, hydroxyphenyl group, diethylaminonaphthyl group, hydroxynaphthyl group, etc., examples of the heteroring moiety which may have a substituent include pyridyl group, furyl group, thiazolyl group, piperazinyl, morpholino group, etc., examples of the phthalimidomethyl group which may have a substituent include a phthalimidomethyl group, nitrophthalimidomethyl group, tert-butylphthalimidomethyl group, methoxyphthalimidomethyl group dichlorophthalimidomethyl group, etc., and examples of the halogen atom include a chlorine atom, bromine atom, iodine atom and fluorine atom. Each of R$^1$ to R$^{11}$ in general formula (I) represents a hydrogen atom, the above-specified alkyl groups which may have a substituent, the above-specified aryl groups which may have a substituent, an acyl group which may have a substituent such as an acetyl group, trifluoroacetyl group, etc., a cycloalkyl group which may have a substituent such as a cyclohexyl group, cyclobutyl group, etc., or a polyether group which may have substituent such as a diethylene glycol monoethyl group, triethylene glycol monobutyl group, etc.

R$^6$ and R$^7$, R$^8$ and R$^9$, or R$^{10}$ and R$^{11}$ may together form a 4- to 7-membered heteroring together with a nitrogen atom to which they are attached, and this heteroring may further contain a nitrogen atom, oxygen atom or sulfur atom. Examples of the heteroring include a pyridyl group, furyl group, thiazolyl group, piperazinyl group, morpholino group, etc.

In R$^{12}$ and R$^{14}$, examples of the alkyl group which may have a substituent, the aryl group which may have a substituent and the cycloalkyl group which may have a substituent include those compounds specified above with regard to X.

Concerning Y in general formula (I) of the present invention, in R$^{15}$, R$^{16}$ and R$^{21}$ to R$^{23}$, examples of the alkyl group which may have a substituent, the aryl group which may have a substituent, the acyl group which may have a substituent, the cycloalkyl group which may have a substituent, the polyether group which may have a substituent and the halogen atom include those compounds specified above with regard to X. Examples of the alkoxy group which may have a substituent include methoxy, n-butoxy, tert-butoxy, and trichloromethoxy groups and others. Examples of the aryloxy group which may have a substituent include phenoxy, nitrophenoxy, dimethylphenoxy, chlorophenoxy, diethylaminophenoxy, naphthoxy, anthroxy and di-n-buthylaminonaphthoxy groups and others.

In R$^{17}$ to R$^{20}$, examples of the alkyl group which may have a substituent, the aryl group which may have a substituent, the acyl group which may have a substituent, the cycloalkyl group which may have a substituent, the alkoxy group which may have a substituent, aryloxy group which may have a substituent, the polyether group which may have a substituent and the halogen atom are those specified above.

In Z of general formula (1) of the present invention, examples of the halogen atom and the alkyl group which may have a substituent are those specified above. In R$^{24}$ to R$^{27}$ and R$^{32}$ for Z, examples of the alkyl group which may have a substituent, the aryl group which may have a substituent, the acyl group which may have a substituent, the cycloalkyl group which may have a substituent, the alkoxy group which may have a substituent, the aryloxy group which may have a substituent and the polyether group which may have a substituent are those specified above. In $R^{28}$ to $R^{31}$, examples of the alkyl group which may have a substituent, the aryl group which may have a substituent, the acyl group which may have a substituent, the cylcoalkyl group which may have a substituent, alkoxy group which may have a substituent, the aryloxy group which may have a substituent, the polyether group which may have a substituent and the halogen atom are also those specified above.

The compounds of general formula (I) can be produced, e.g. by the following process.

That is, an isoindolenine represented by the following formula (II) and various metal salts, or carboxylic anhydrides, imides or nitriles as starting materials are treated according to an ordinary process to form phthalocyanine compounds represented by the following general formula (III).

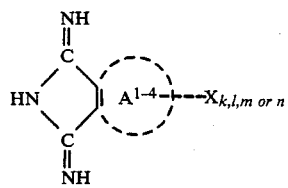

General formula (II)

wherein $A^{1-4}$, X, k, l, m and n have the same meanings as those defined in general formula (I).

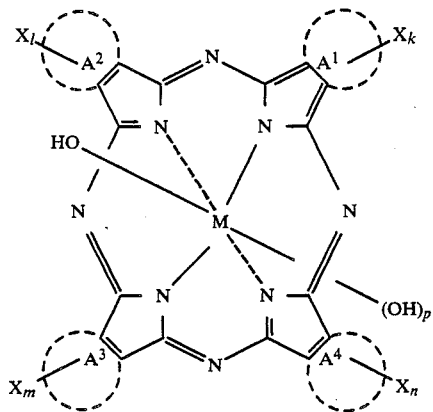

General formula (III)

wherein rings $A^1$ to $A^4$, M, X, k, l, m, n, and p have the same meanings as those defined in general formula (I).

Then, the resultant phthalocyanine compounds represented by general formula (III) are reacted with various phosphorus compounds or selenium compounds to give phthalocyanine compounds represented by general formula (I).

The typical examples of the phthalocyanine compounds usable in the present invention include the following compounds (a) to (s), in which Ph represents a phenyl group and Me represents a methyl group.

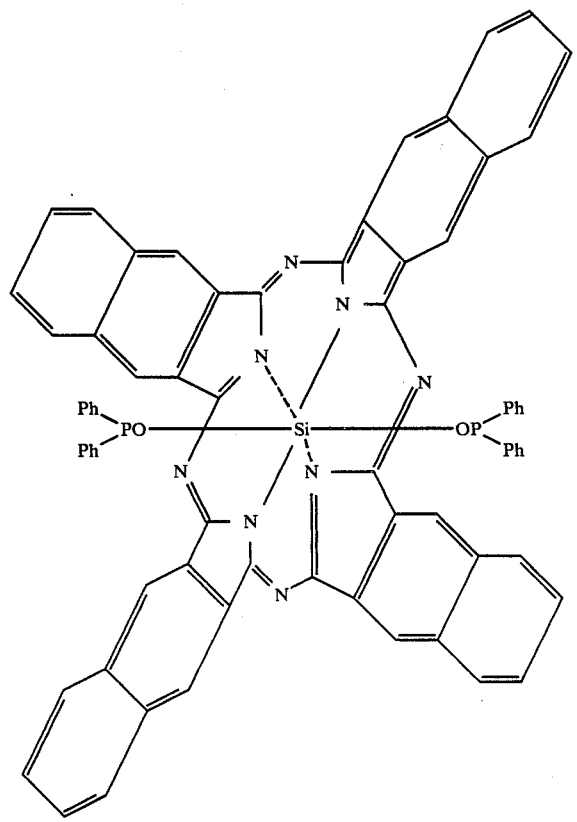

(a)

(b)
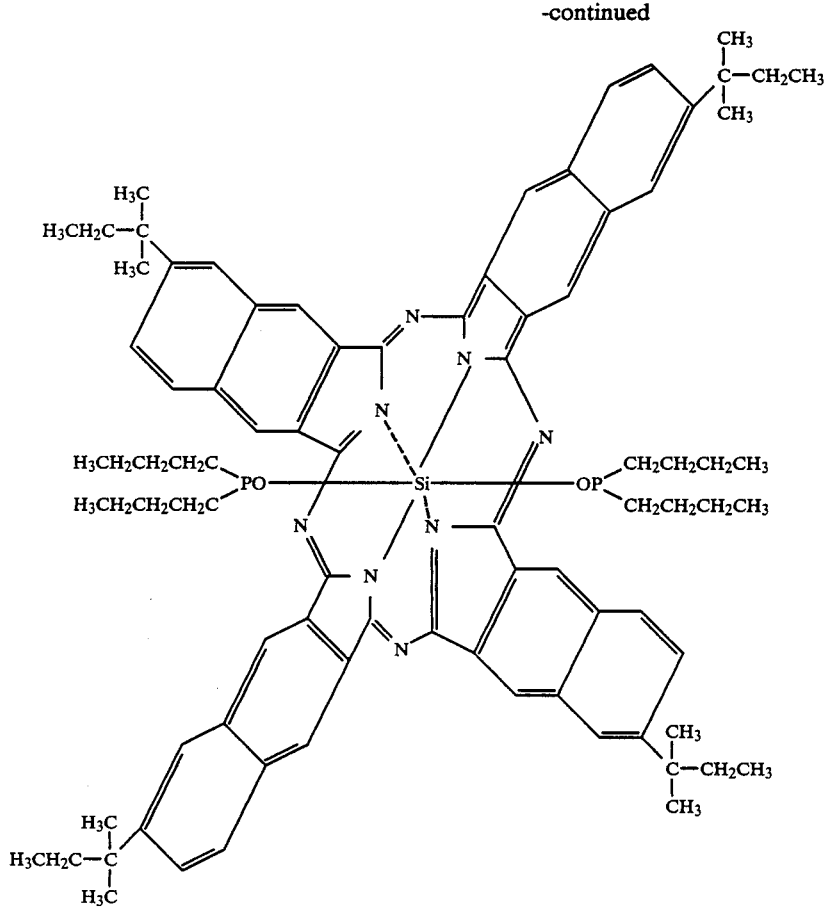
(c)
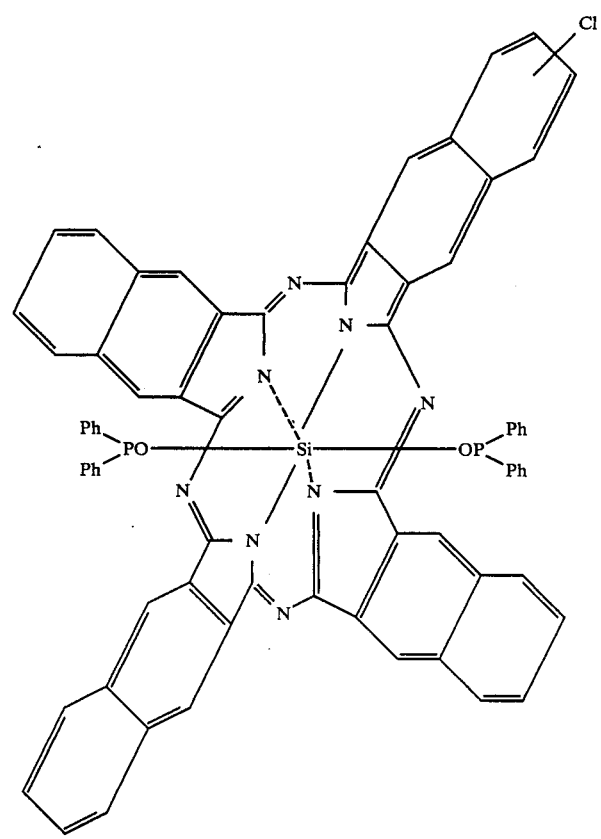

-continued
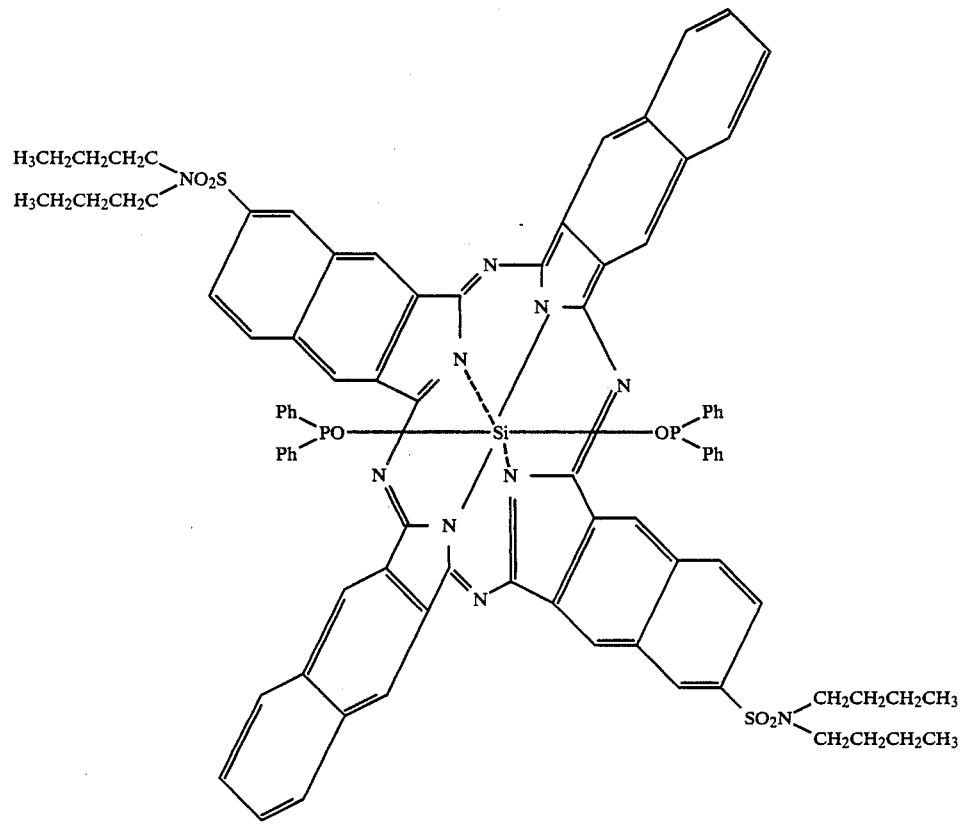
(d)
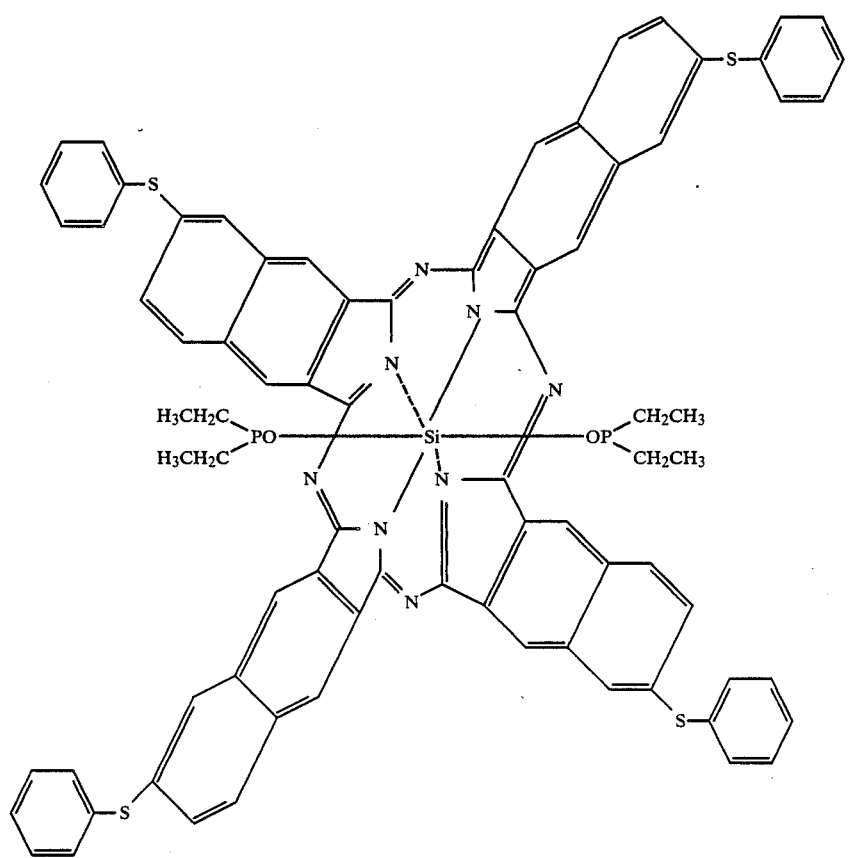
(e)

-continued
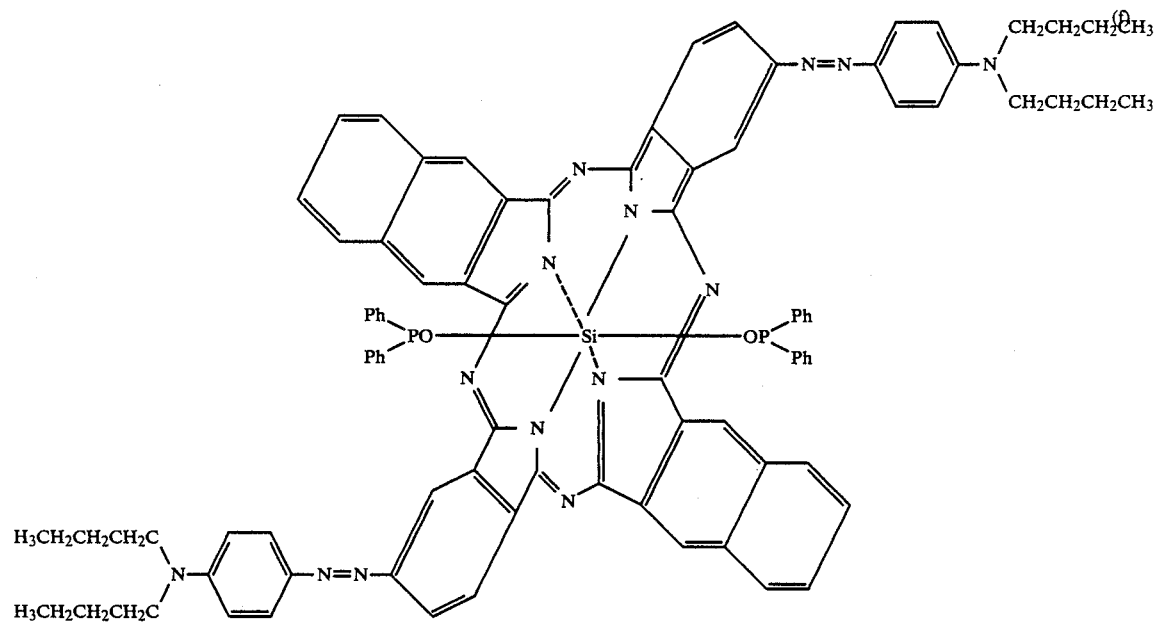
(g)
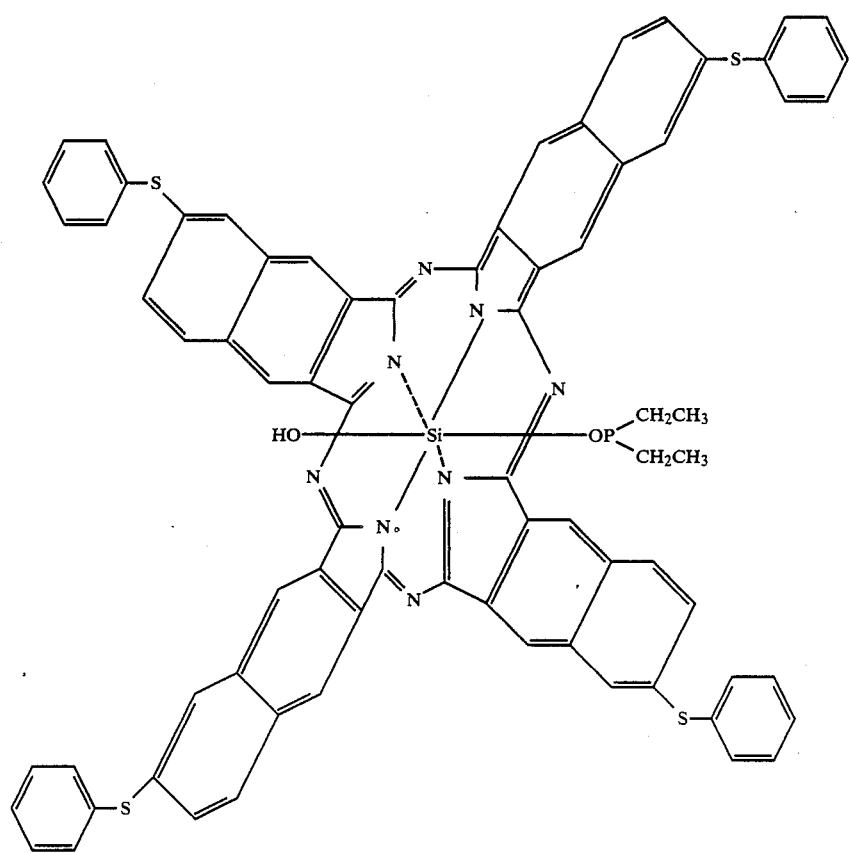

-continued
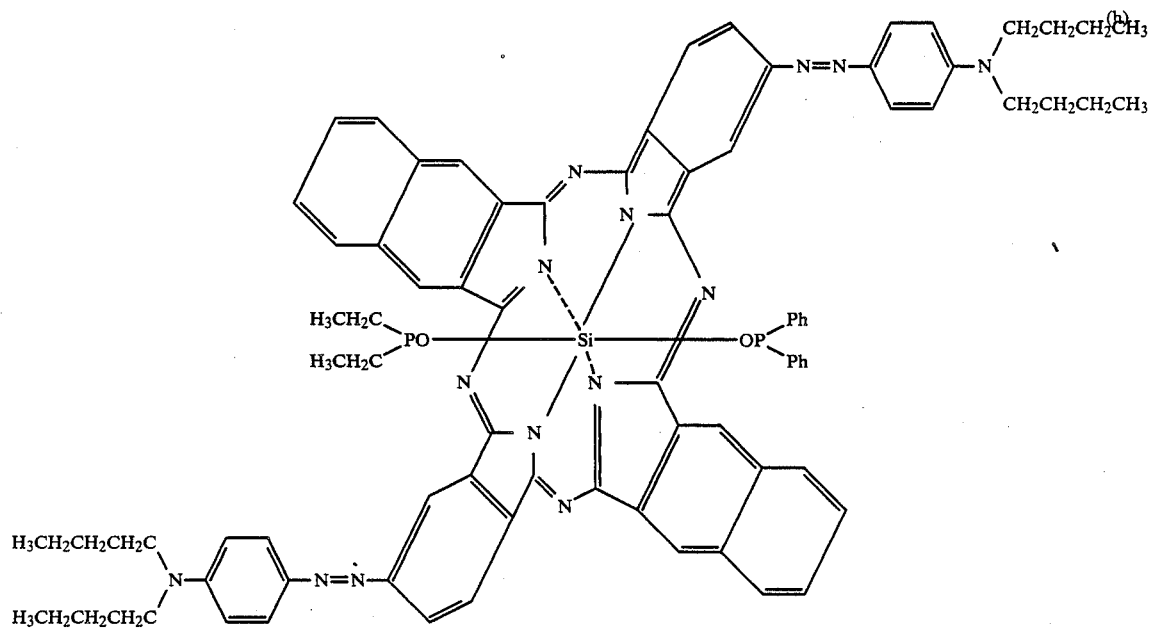
(h)
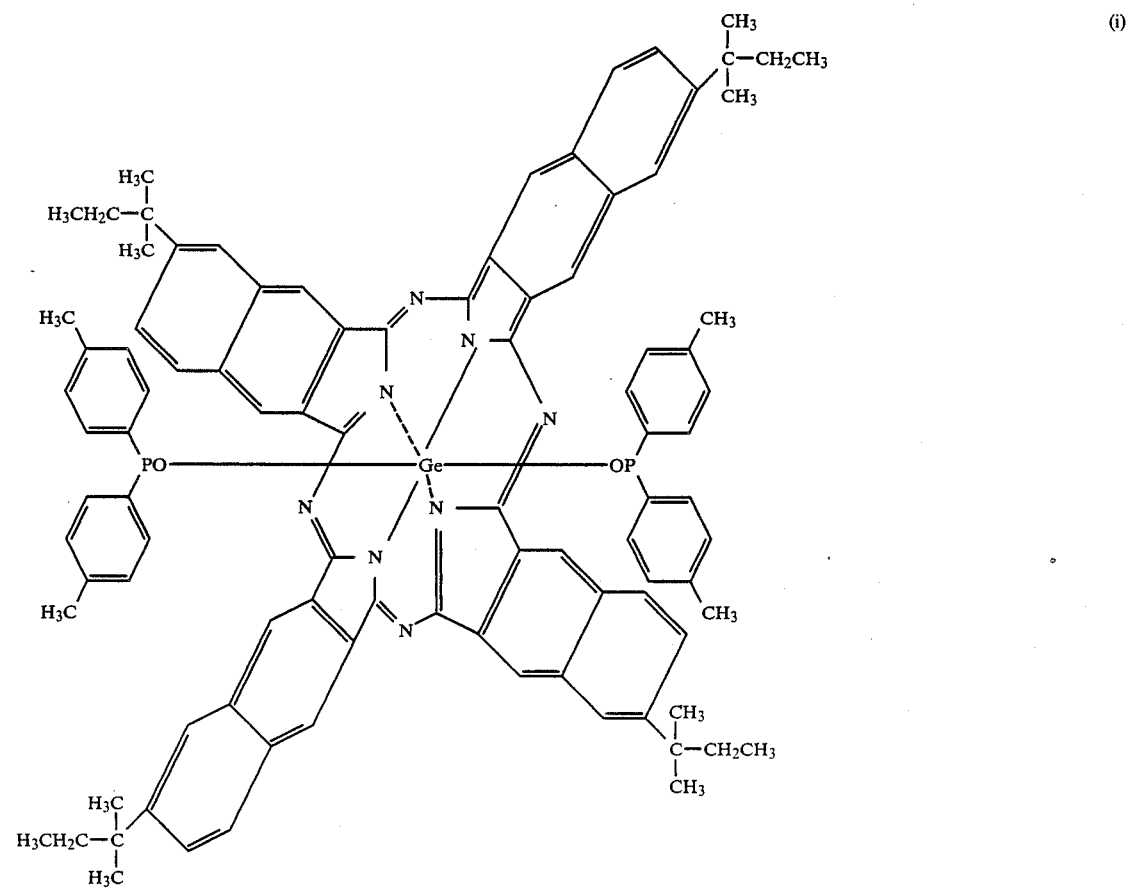
(i)

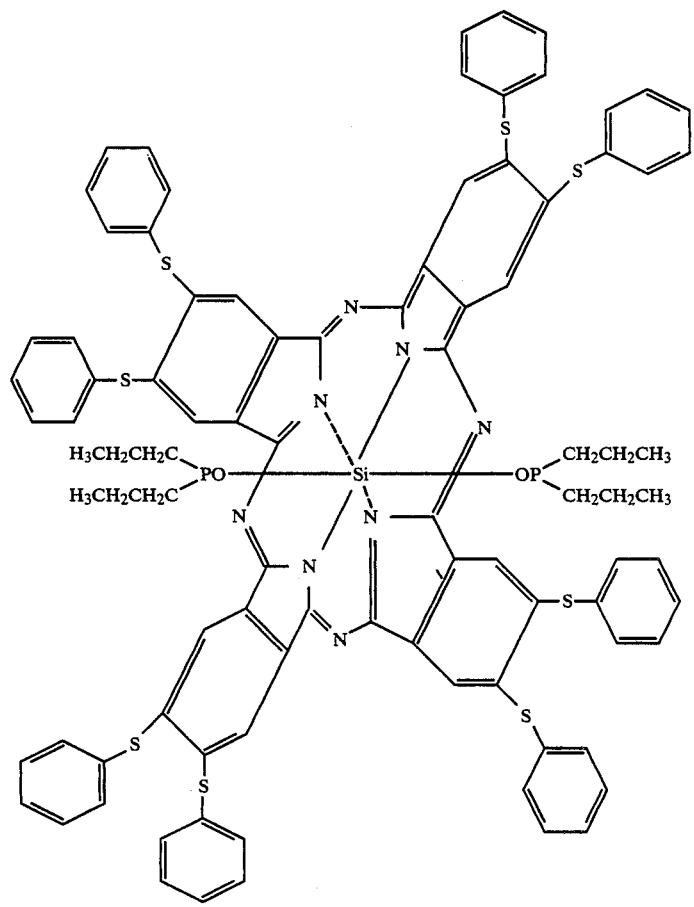
(j)
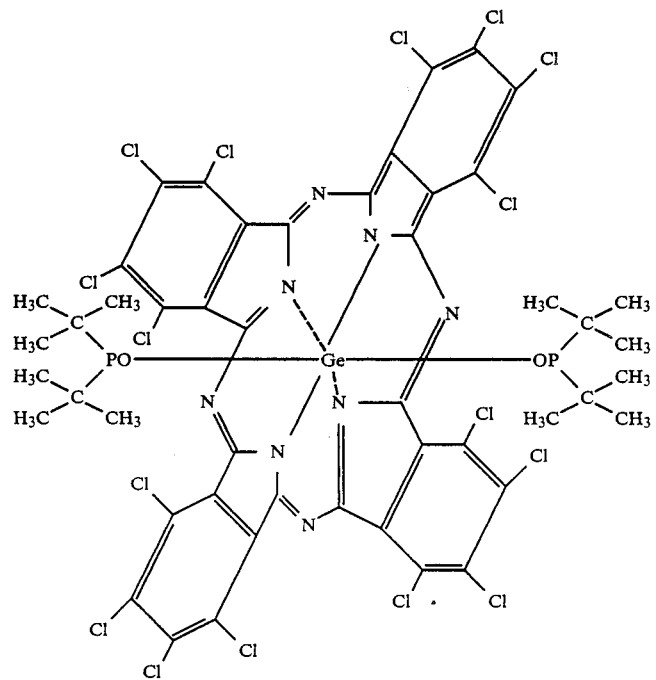
(k)

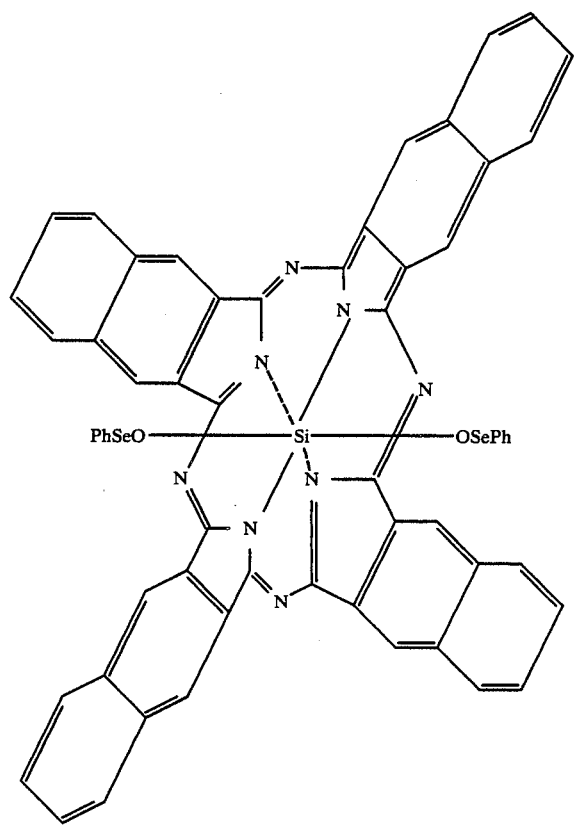
(l)
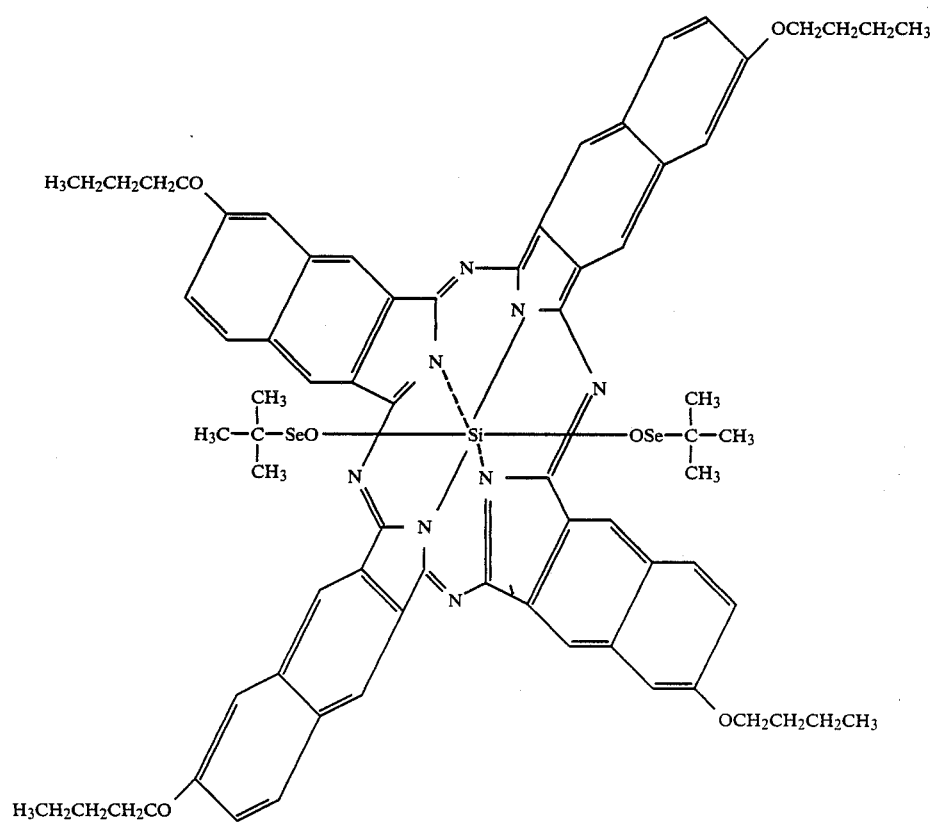
(m)

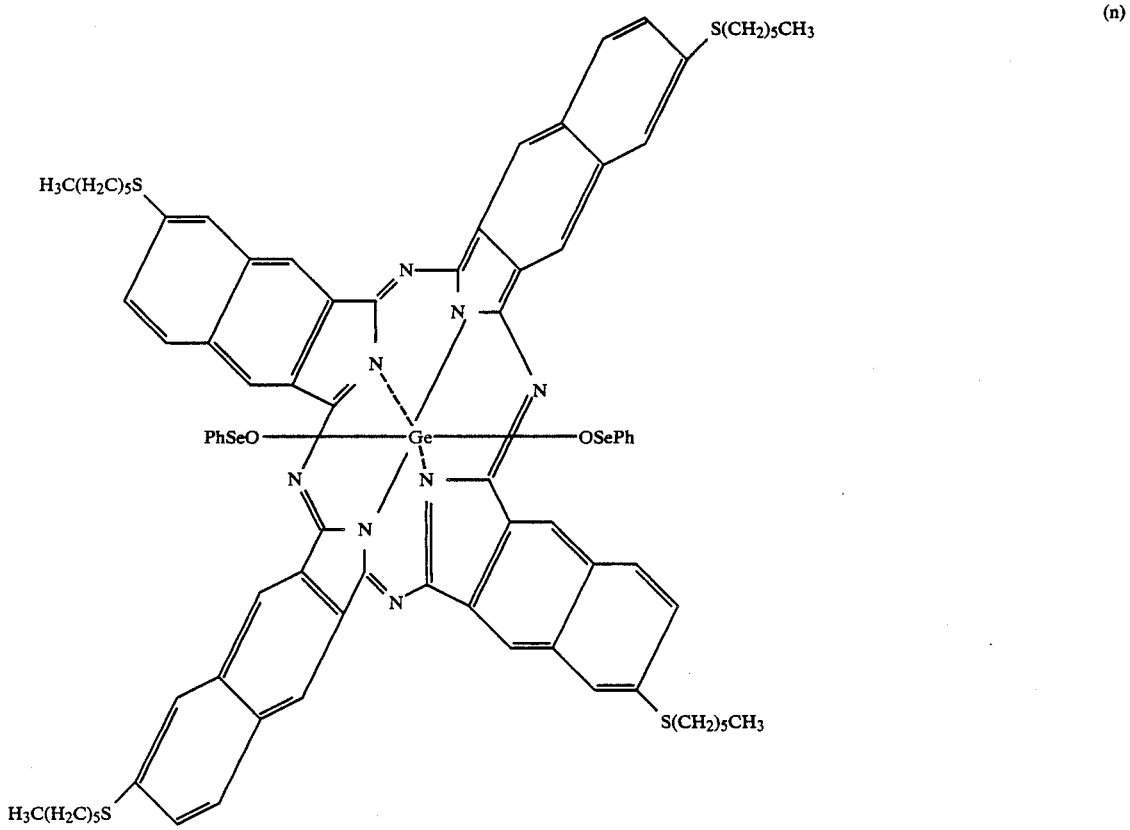
(n)
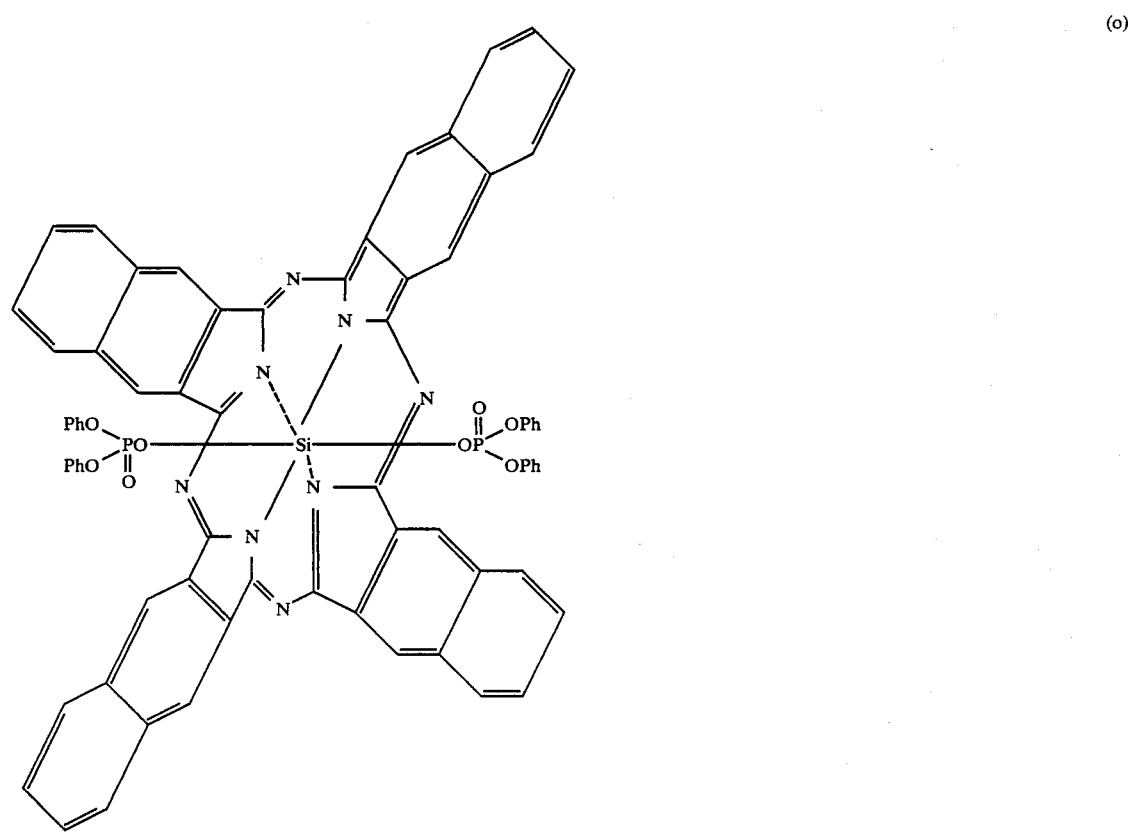
(o)

-continued
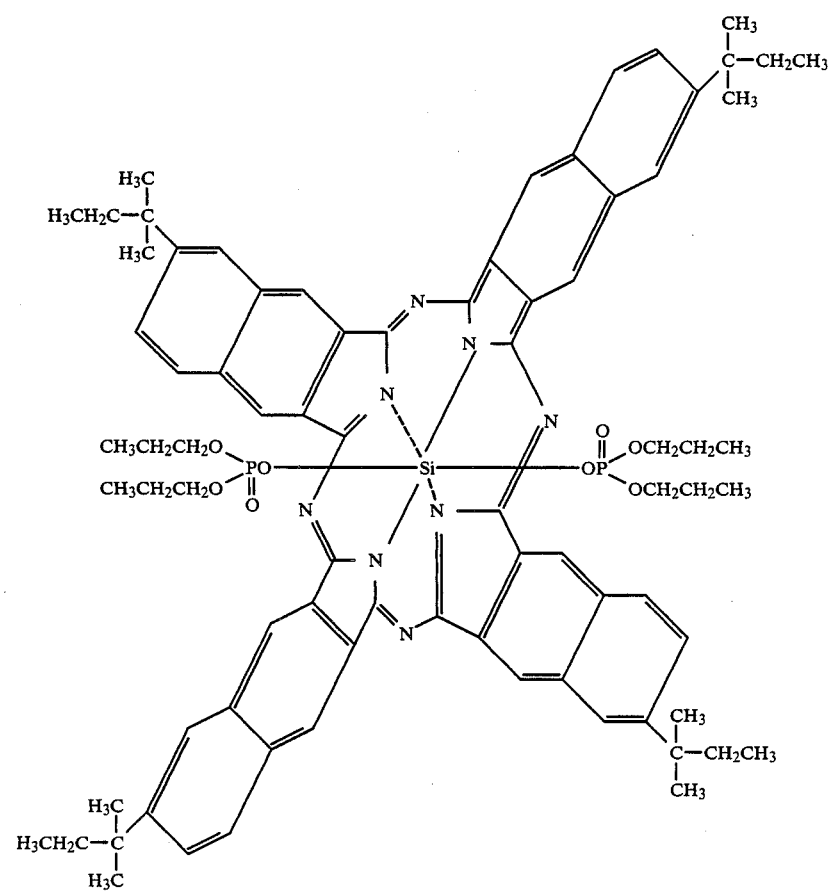
(p)

-continued
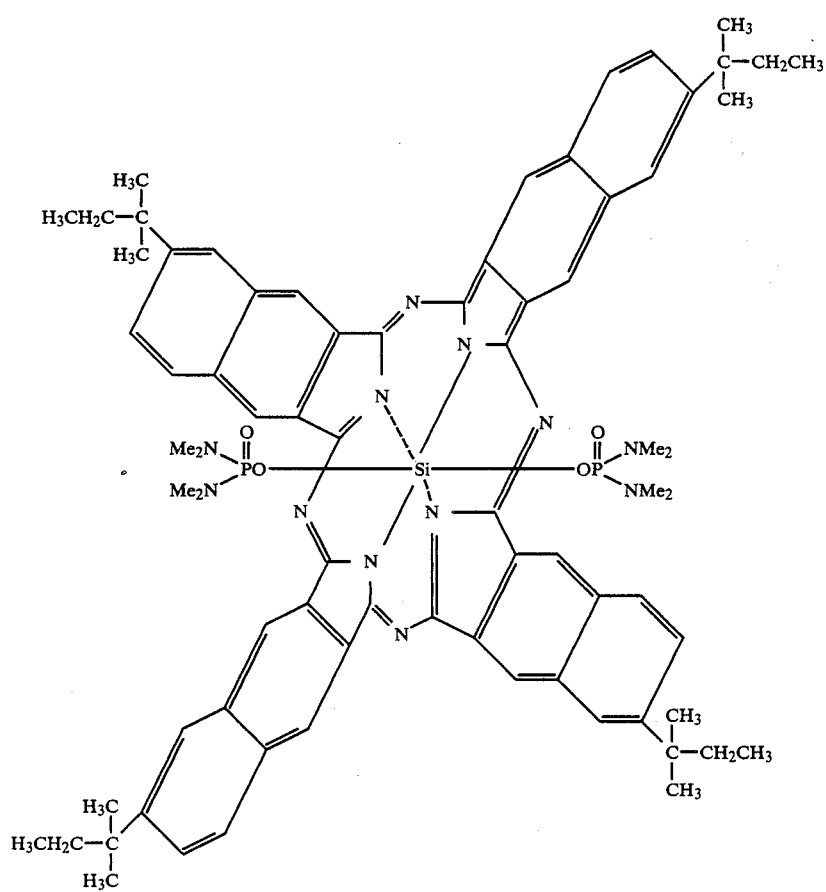
(q)

-continued
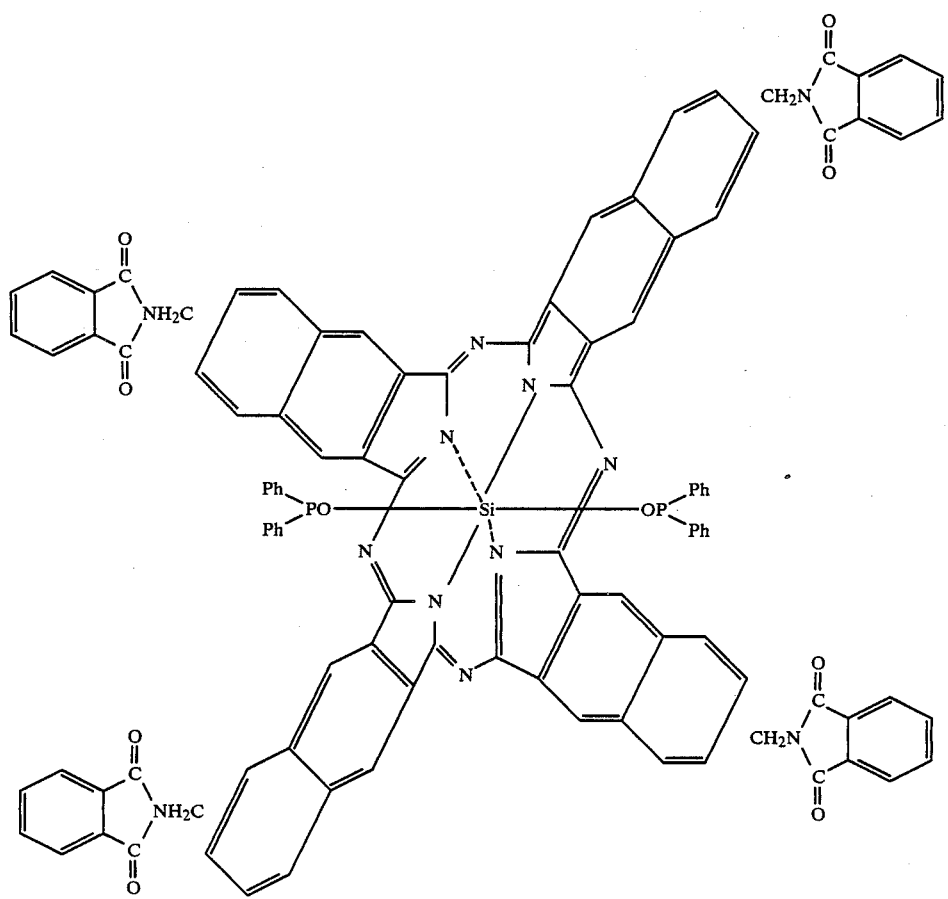
(r)

-continued

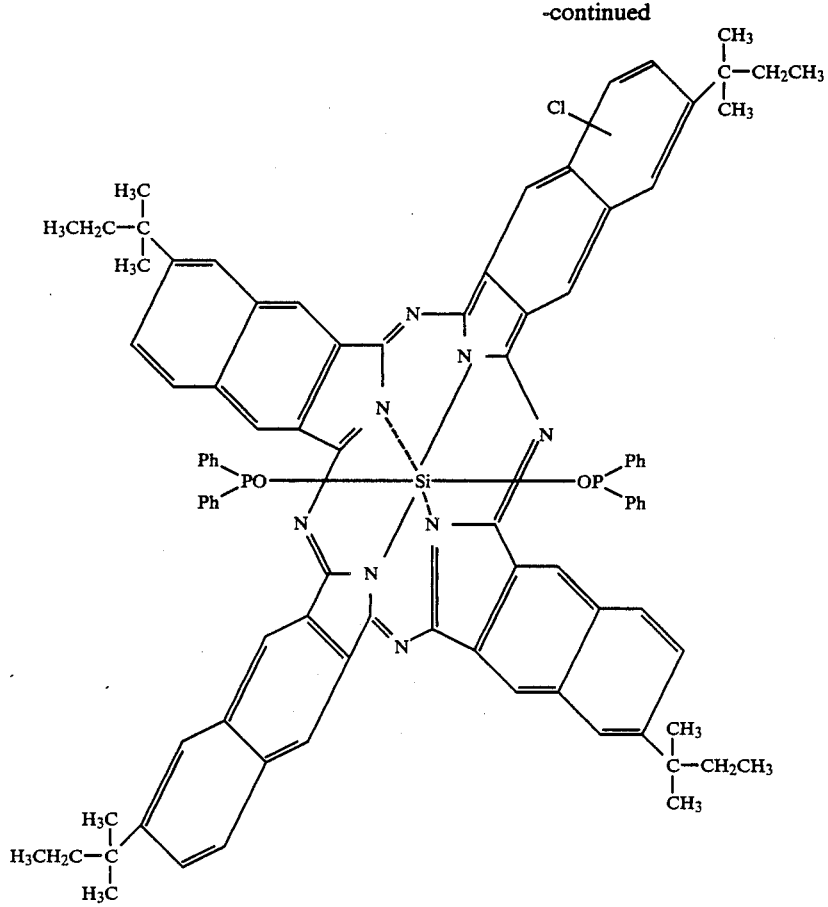

(s)

Substrates usable in the present invention preferably have a light transmissivity of not less than 85% to read and write signals and have small optical anisotropy. Examples of the substrates include glass, or that of a thermoplastic resin such as an acrylic resin, a polycarbonate resin, a polyester resin, a polyamide resin, a vinyl chloride resin, a vinyl acetate resin, a polystyrene resin, a polyolefin resin (e.g. poly-4-methylpentene, etc.), polyethersulfone resin, etc., or a thermosetting resin such as an epoxy resin, an allyl resin, etc. Among these substrates, preferably usable is that of a thermoplastic resin in view of ease in molding, ease in providing guide grooves, address signals, etc., and further, particularly preferable is that of an acrylic resin or a polycarbonate resin in view of optical characteristics.

The thickness of these transparent substrates is not specially limited, and their form may be plate-like or film-like. Their form may further be cylindrical or card-like, and their size is not specially limited.

The substrate usually has a guide groove with which to control positions for writing and reading, and concaves and convexes to preformat address signals, various marks, etc., and these concaves and convexes are formed preferably by using a stamper, etc., when the above-referred thermoplastic resins are molded (by injection molding, compression molding, etc.).

In the optical recording medium of the present invention, the organic thin film containing the phthalocyanine compound is formed on a substrate by a vacuum deposition method, a sputtering method, an ion-plating method, an LB method (Langmuir-Blodgett's method), or the like. However, the procedures of these methods are complicated, and their productivity is low. And the phthalocyanine compounds of general formula (I) have higher solubility in ordinary organic solvents than organic dyestuffs used in conventional optical recording media having an organic thin film. For these reasons, a coating method using a spin coater, etc., is the most advantageous in the present invention. When the organic thin film which is a recording layer is formed by a coating method, the phthalocyanine compound may be dispersed or dissolved in an ordinary organic solvent such as alcohols, ketones, amides, sulfoxides, ethers, esters, aliphatic hydrocarbon halides, aromatic hydrocarbons, etc. The most preferable solvent is an aliphatic hydrocarbon having at least one unsaturated bond. In this case, a polymer binder may be added as required. Examples of the polymer binder include vinyl chloride resin, acrylic resin, polyester resin, polyamide resin, polycarbonate resin, epoxy resin, methacrylic resin, vinyl acetate resin, nitrocellulose resin, phenolic resin, etc. The amount of the polymer binder for use is preferably not more than 10% by weight of the phthalocyanine compound.

In the present invention, it is possible to use a mixture prepared by dispersing or dissolving some other dyestuffs in the phthalocyanine compound. Examples of the other dyestuffs include known aromatic or unsaturated aliphatic diamine metal complex, aromatic or unsaturated aliphatic dithiol metal complex, phthalocyanine complex, naphthalocyanine complex, squarylium dyestuff, naphthoquinone complex, anthraquinone complex, polymethine dyestuff, etc.

The recording layer containing the phthalocyanine compound, formed on a substrate, has a thickness of not more than 10 μm, preferably from 500 Å to 2 μm. In some cases, the wavelength of absorption by the organic thin film is shifted to a longer wavelength side by exposing the coated organic thin film to vapor of an organic solvent such as chloroform, tetrahydrofuran, toluene, etc, and the sensitivity to lights in the oscillation wavelength region of a semiconductor laser may be remarkably improved.

In order to protect the recording layer, a protective layer may be formed by vapor-depositing an inorganic compound such as $Al_2O_3$, $SiO_2$, SiO, SnO, etc, and a polymer may be coated as the protective layer.

Further, in order to increase reflection level of the recording layer, it is also possible to form a reflection film of a metal such as gold, silver, copper, platinum, aluminum, cobalt, tin, etc., a metal oxide such as MgO, ZnO, $SnO_2$, etc., a nitride such as $SiN_4$, AlN, TiN, etc., a chalcogen compound such as Te, Se, S, etc., or the like.

The recording onto the recording medium obtained as above is effected by irradiating the recording layer formed on the substrate with a laser beam, which is focussed into about 1 μm, preferably a semiconductor laser beam. That portion of the recording layer which is irradiated with a laser beam causes a thermal change of state such as decomposition, evaporation, melting, etc., by absorption of a laser energy. The readout is effected by reading a reflectivity difference between a portion having the thermal change and a protion having no change. The phthalocyanine compound of general formula (I) exhibits a very large reflectivity difference between a recorded state and a nonrecorded state as compared with conventional organic dyestuffs used in optical recording media containing an organic thin film, and it is therefore very advantageous.

As the laser, various lasers such as a He-Ne laser, an Ar laser, a semiconductor laser, etc., are usable, and the semiconductor laser is particularly preferable in view of price and size. As the semiconductor laser, usable are those having a medium wavelength of 830 nm or 780 nm or a shorter wavelength than these.

The aliphatic hydrocarbon having at least one unsaturated bond, for use in the process of the present invention, is preferably selected from a group consisting of alkene, cycloalkene, alkyne, cycloalkyne, and these with an- OH group in their skeleton. Examples of these aliphatic hydrocarbons having at least one unsaturated bond include 1,7-octadiene, cyclohexene, 4-methylcyclohexene, cyclooctene, 1,3-cyclooctene, 4-vinyl-1-cyclohexene, 3-metyl-1-pentyn-3-ol, 3-methyl-1-butyn-3-ol, etc. However, the present invention is not limited to these only. These hydrocarbons may be selected from commercially available ones, or may be produced according to an ordinary process. These aliphatic hydrocarbons having at least one unsaturated bond may be used in combination, and may also be used by mixing them with some other solvent which do not corrode a polycarbonate resin substrate, such as alcoholic unsaturated hydrocarbons.

These aliphatic hydrocarbons having at least one unsaturated bond do not corrode the polycarbonate resin substrate, and therefore, when they are used as a solvent for a coating liquid to form a recording layer, no treatment on the substrate surface is necessary. The coating is effected by a spin-coat method, etc., and the spinning rate is changed depending upon boiling point of the solvent and concentration of the coating liquid in order to coat the dyestuff having a suitable thickness for writing and reading of records. The formed coating is dried at a temperature between 50 and 100° C. for about 10 minutes to 60 minutes.

As a transparent substrate for use in the process of the present invention, a polycarbonate resin substrate is preferably usable. However, substrates of other resins may also be used.

The technique of coating the phthalocyanine dyestuff in the present invention is widely applicable not only to dyestuff coating in manufacture of write once type optical recording media according to ISO but also to manufacture of a recording film and a reflection film of a write once type compact disk according to Compact Disk standard.

According to the present invention, the reflectivity difference between a recorded state and a nonrecorded state is very large, and there are hence provided an optical recording medium which permits high-sensitivity writing and reading, and a process for the production thereof.

According to the present invention, there are provided an optical recording medium having chemical and physical stability, and a process for the production thereof.

According to the present invention, the recording layer in a thin film state can be formed on a substrate by a coating method having excellent productivity and workability, since the phthalocyanine compound of general formula (I) has high solubility in organic solvents.

Further, according to the present invention, there is provided a process for the production of an optical recording medium, in which the recording layer can be formed on a transparent substrate without corroding the substrate, particularly, of a polycarbonate by selecting the specific solvent and dissolving the phthalocyanine compound therein.

EXAMPLES

The present invention will be explained hereinbelow by reference to Examples, to which, however, the present invention shall not be limited. In Examples, "part" stands for "part by weight".

PREPARATION EXAMPLE 1

Phthalocyanine compounds (a) to (k): 7.8 parts of 1,3-diiminobenzoisoindoline and 5.0 parts of silicon tetrachloride were added to 50 parts of quinoline, and the mixture was stirred under heat of 180° to 200° C. for 3 hours. Then, the reaction mixture was cooled, diluted with 500 parts of methanol and filtered, and the resultant solid was washed with methanol and dimethylformamide and dried to give 7.0 parts of dihydroxysiliconnaphthalocyanine.

5.0 parts of the dihydroxysiliconenaphthalocyanine, 50 parts of chlorodiphenylphosphine, 50 parts of tri-n-butylamine and 300 parts of pyridine were stirred under heat of 110° C. for 2 hours. Then, the reaction mixture was cooled, diluted with 1,000 parts of methanol and filtered to obtain a filtrate. The methanol was distilled off from the filtrate under reduced pressure and heat.

The resultant product was all added to 500 parts of dilute hydrochloric acid to form a precipitate, and the precipitate was filtered, washed with water and dried at 80° C. to give 3.0 parts of a phthalocyanine compound. compound.

Phthalocyanine compounds (b) to (k) were also prepared according to the preparation procedure for the phthalocyanine compound (a) except for changes summarized below.

Compound (b) was prepared by replacing the 1,3-diiminobenzoindoline with tert-amyl-1,3-diiminobezoisoindoline and the chlorodiphenylphosphine with di-n-butyl-chlorophosphine.

Compound (c) was prepared by using 100 parts of chlorodipheny instead of 50 parts.

Compound (d) was prepared by replacing the 1,3-diiminobenzoindoline with 3.9 parts of 1,3-diiminobenzoisoindoline and 3.9 part of N,N-di-n-butylsulfoneamide-1,3-diiminobenzoisoindoline.

Compound (e) was prepared by replacing the 1,3-diiminobenzoindoline with thiophenoxy-1,3-diiminobenzoisoindoline and the chlorodiphenylphosphine with diethylchlorophosphine.

Compound (f) was prepared by replacing the 1,3-diiminobenzoindoline with 3.9 parts of 1,3-diiminobenzoisoindoline and 3.9 parts of di-n-butylaminophenylazo-1,3-diiminoisoindoline.

Compound (g) was prepared by replacing the 1,3-diiminobenzoindoline with thiophenoxy-1,3-diiminobenzoisoindoline and the chlorodiphenylphosphine with 25 parts of diethylchlorophosphine.

Compound (h) was prepared by replacing the 1,3-diiminobenzoindoline with 3.9 parts of 1,3-diiminobenzoisoindoline and 3.9 parts of di-n-butylaminophenylazo-1,3-diiminoisoindoline and the chlorodiphenylphosphine with 25 parts of chlorodiphenylphosphine and 25 parts of diethylchlorophosphine.

Compound (i) was prepared by replacing the silicon tetrachloride with germanium tetrachloride, the 1,3-diiminobenzoindoline with tert-amyl-1,3-diiminobenzoisoindoline and the chlorodiphenylphosphine with chlorodi-p-tolylphosphine.

Compound (j) was prepared by replacing the 1,3-diiminobenzoindoline with dithiophenoxy-1,3-diiminoisoindoline and the chlorodiphenylphosphine with chlorodi-n-propylphosphine.

Compound (k) was prepared by replacing the silicon tetrachloride with germanium tetrachloride, the 1,3-diiminobenzoindoline with tetrachloro-1,3-diiminoisoindoline and the chlorodiphenylphosphine with di-tertbutylchlorophosphine.

PREPARATION EXAMPLE 2

Phthalocyanine compounds (1) to (n):

5.0 parts of the same dihydroxysiliconnaphthalocyanine as that obtained in Example 1, 50 parts of benezeneselenenylchloride, 50 parts of tri-n-butylamine and 300 parts of pyridine were stirred under heat of 110° C. for 2 hours, and then the reaction mixture was cooled, diluted with 1,000 parts of methanol and filtered to obtain a filtrate. The methanol was distilled off from the filtrate under reduced pressure and heat.

The resultant product was all added to 500 parts of dilute hydrochloric acid to form a precipitate. The precipitate was filtered, washed with water and dried at 80° C. to give 2.5 parts of a phthalocyanine compound (1).

Phthalocyanine compounds (m) and (n) were also prepared according to the preparation procedure for the phthalocyanine compound (1) except for changes summarized below.

Compound (m) was prepared by replacing the 1,3-diiminobenzoisoindoline with n-butoxy-1,3-diiminobenzoisoindoline and the phenylselenenylchloride with tertbutylselenenylchloride.

Compound (n) was prepared by replacing the silicon tetrachloride with germanium tetrachloride and the 1,3-diiminobenzoisoindoline with n-hexylmercapto-1,3-diiminobenzoisoindoline.

PREPARATION EXAMPLE 3

Phthalocyanine compounds (o) and (p):

5.0 parts of the same dihydroxysiliconnaphthalooyanine as that obtained in Example 1, 50 parts of chlorodiphenylphosphate, 50 parts of tri-n-butylamine and 300 parts of pyridine were stirred under heat of 110° C. for 2 hours, and then the reaction mixture was cooled, diluted with 1,000 parts of methanol and filtered to obtain a filtrate. The methanol was distilled off from the filtrate under reduced pressure and heat.

The resultant product was all added to 500 parts of dilute hydrochloric acid to form a precipitate. The precipitate was filtered, washed with water and dried at 80° C. to give 2.8 parts of a phthalocyanine compound (o).

Compound (p) was also prepared in the same way as above except that the 1,3-diiminobenzoisoindoline was replaced with tert-amyl-1,3-diiminobenzoisoindoline and that the chlorodiphenylphosphate was replaced with chlorodi-n-propylphosphate.

PREPARATION EXAMPLE 4

Phthalocyanine compound (q):

5.0 parts of the same dihydroxysiliconnaphthalocyanine as that obtained in Example 1, 50 parts of bis(dimethylamino)phosphorylchloride, 50 parts of tri-n-butylamine and 300 parts of pyridine were stirred under heat of 110° C. for 2 hours, and then the reaction mixture was cooled, diluted with 1,000 parts of methanol and filtered to obtain a filtrate. The methanol was distilled off from the filtrate under reduced pressure and heat.

The resultant product was all added to 500 parts of dilute hydrochloric acid to form a precipitate. The precipitate was filtered, washed with water and dried at 80° C. to give 3.0 parts of a phthalocyanine compound (q).

PREPARATION EXAMPLE 5

Phthalocyanine compound (s):

7.8 parts of tert-amyl-1,3-diiminobenzo-isoindoline and 5.0 parts of silicon tetrachloride were added to 50 parts of quinoline, and the mixture was stirred under heat of 180° C. to 200° C. for 3 hours. Then, the reaction mixture was cooled, diluted with 500 parts of methanol and filtered, and the resultant solid was washed with methanol and dimethylformamide and dried to give 7.0 parts of tetra-tert-amyldihydroxysiliconnaphthalocyanine.

5.0 parts of the tetra-tert-amyldihydroxysiliconnaphthalocyanine, 50 parts of chlorodiphenylphosphine, 50 parts of tri-n-butylamine and 300 parts of pyridine were stirred under heat of 110° C. for 2 hours, and then the reaction mixture was cooled, diluted with 1,000 parts of methanol and filtered to obtain a filtrate. The methanol was distilled off from the filtrate under reduced pressure and heat.

The resultant product was all added to 500 parts of dilute hydrochloric acid to form a precipitate. The precipitate was filtered, washed with water and dried to give 3.0 parts of a phthalocyanine compound (s).

PREPARATION EXAMPLE 6

Phthalocyanine compound (r):

5.0 parts of the dihydroxysiliconnaphthalocyanine prepared in Preparation Example 1 was dissolved in 500 parts of concentrated sulfuric acid, and 18.0 parts of hydroxymethylphthaldimide was further added. The mixture was stirred under heat at 50° C. for 3 hours. The resultant reaction liquid was added to 2,500 parts of ice water to give a precipitate. The precipitate was filtered, washed with water, and dried at 80° C. 5.0 parts of the resultant product, 50 parts of chlorodiphenylphosphine, 50 parts of tri-n-butylamine and 300 parts of pyridine were stirred under heat at 110° C. for 2 hours. Then, the reaction mixture was cooled, diluted with 1,000 parts of methanol and filtered to give a filtrate. The filtrate was heated under reduced pressure to distill off the methanol. The resultant product was all added to 500 parts of dilute hydrochloric acid, and the resultant precipitate was filtered, washed with water and dried at 80° C. to give 3.2 parts of a phthalocyanine compound (r).

EXAMPLE 1

A solution of 3.0 parts of the phthalocyanine compound (a) in 97.0 parts of chloroform was dropped on a glass substrate, and the substrate was then subjected to spinning at a rate of 1,200 rpm for 20 seconds. And the resultant coating was dried at 80° C. for 20 minutes to give an optical recording medium.

The optical recording medium had a recording layer having a thickness of 780 Å, a maximum absorption wavelength of 815 nm and a reflectivity, to a light having a wavelength of 830 nm, of 42%.

The optical recording medium was attached to a turn table, and while the turn table was turned at 1,800 rpm, the recording medium was irradiated with an 830 nm laser beam, focussed into 1.0 μm, at 5 mW and 8 MHz.

The surface of the recorded optical recording medium was observed by using a scanning electron microscope to show clear formation of pits. Further, detection of reflected lights was carried out by irradiating the optical recording medium with an 830 nm laser beam at 0.4 mW to show a C/N ratio of 53 dB.

EXAMPLE 2

A solution of 2.5 parts of the phthalocyanine compound (b) in 97.5 parts of methyl cellosolve was dropped on a polycarbonate resin substrate, and the substrate was then subjected to spinning at a rate of 800 rpm for 30 seconds, and the resultant coating was dried at 80° C. for 15 minutes to give an optical recording medium.

The optical recording medium had a recording layer having a thickness of 850 Å, a maximum absorption wavelength of 810 nm and a reflectivity, to a light having a wavelength of 830 nm, of 40%.

Recording was effected on the optical recording medium in the same way as in Example 1 to show clear formation of pits, and the C/N ratio was 51 dB.

EXAMPLES 3-19

The phthalocyanine compounds (c) to (s) were coated on glass substrates in the same way as in Example 1, and the coatings were dried to give optical recording media.

Table 1 shows maximum absorption wavelength and reflectivity, to a light having a wavelength of 830 nm, of the optical recording media and C/N ratio when recording and reading were effected in the same way as in Example 1.

TABLE 1

| Example | Phthalo-cyanine compound | Maximum absorption wavelength (nm) | Reflectivity to 830 nm light (%) | C/N ratio (dB) |
|---|---|---|---|---|
| 3 | c | 815 | 46 | 52 |
| 4 | d | 820 | 42 | 54 |
| 5 | e | 830 | 46 | 52 |
| 6 | f | 825 | 41 | 52 |
| 7 | g | 810 | 43 | 55 |
| 8 | h | 825 | 40 | 51 |
| 9 | i | 820 | 44 | 55 |
| 10 | j | 825 | 44 | 52 |
| 11 | k | 820 | 47 | 55 |
| 12 | l | 805 | 43 | 48 |
| 13 | m | 800 | 40 | 46 |
| 14 | n | 805 | 45 | 46 |
| 15 | o | 835 | 42 | 50 |
| 16 | p | 830 | 41 | 49 |
| 17 | q | 805 | 40 | 46 |
| 18 | r | 820 | 48 | 55 |
| 19 | s | 830 | 50 | 58 |

EXAMPLE 20

A dyestuff 1 [represented by the formula (IV)] as a recording dyestuff was dissolved in cyclohexene to form a solution having 1% by weight of the dyestuff, and the solution was coated on a polycarbonate grooved substrate having a diameter of 13 cm by using a spin coater. The coating was dried at 60° C. for 30 minutes to form a recording layer having a thickness of 0.06 μm. It was possible to carry out the coating procedure without any problem, and the adhesion between the substrate and the recording layer was excellent. When writing and reading of the resultant recording medium were tested by using a disk evaluation apparatus using a semiconductor laser emitting a light of 830 nm wavelength, it was possible to obtain a C/N ratio of 50 dB under the conditions that the linear speed was 4 m/s, the recording frequency was 1,000 kHz, the writing laser power was 7 mW and the reading laser power was 0.8 mW.

In addition, a polycarbonate grooved substrate having a diameter of 13 cm as a resin substrate was immersed in cyclohexene for 5 minutes to examine a change in the substrate. Then, the substrate surface was observed by using an optical microscope to show no change in form of the groove, etc.

EXAMPLE 21

A dyestuff 2 [represented by the formula (IV)] as a recording dyestuff was dissolved in the same solvent as that used in Example 20 to form a solution having 1% by weight of the dyestuff, and the solution was coated on a polycarbonate grooved substrate having a diameter of 13 cm by using a spin coater. The coating was dried at 60° C. for 30 minutes to form a recording layer having a thickness of 0.07 μm. Writing and reading tests were carried out under the same conditions as those of Example 20 to give a C/N ratio of 52 dB.

EXAMPLE 22

A dyestuff 3 [represented by the formula (IV)] as a recording dyestuff was dissolved in 3-methyl-1-butyn-3-ol to form a solution having 1% by weight of the dyestuff, and the solution was coated on a polycarbonate grooved substrate having a diameter of 13 cm by using a spin coater. The coating was dried at 60° C. for 30 minutes to form a recording layer having a thickness of 0.07 μm. Writing and reading tests were carried out under the same conditions as those of Example 20 to give a C/N ratio of 42 dB.

In addition, a polycarbonate grooved substrate having a diameter of 13 cm as a resin substrate was immersed in 3-methyl-1-butyn-3-ol for 5 minutes to examine a change in the substrate. Then, the substrate surface was observed by using an optical microscope to show no change in form of the groove, etc.

EXAMPLE 23

A dyestuff 4 [represented by the formula (V)] as a recording dyestuff was dissolved in the same solvent as that used in Example 20 to form a solution having 1% by weight of the dyestuff, and the solution was coated on a polycarbonate grooved substrate having a diameter of 13 cm by using a spin coater. The coating was dried at 60° C. for 30 minutes to form a recording layer having a thickness of 0.07 μm. When writing and reading of the resultant recording medium were tested by using a disk evaluation apparatus using a semiconductor laser emitting a light of 780 nm wavelength, it was possible to obtain C/N ratio of 40 dB under the conditions that the linear speed was 4 m/s, the recording frequency was 1,000 kHz, the writing laser power was 7 mW and the reading laser power was 0.8 mW.

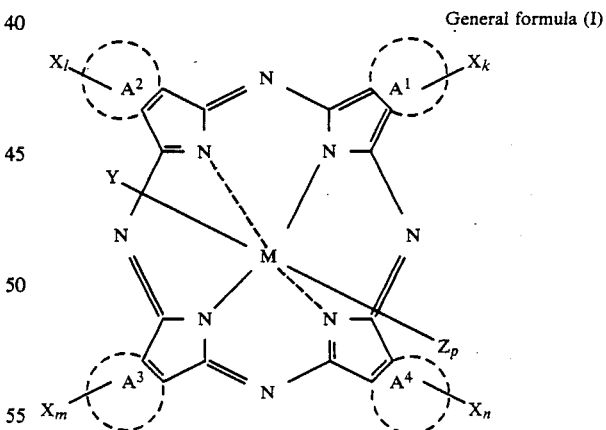

What is claimed is:

1. An optical recording medium which comprises an organic thin film layer containing at least one of phthalocyanine compounds represented by the following general formula (I)

General formula (I)

wherein
rings $A^1$ to $A^4$ each independently represent a benzene ring, naphthalene ring or anthracene ring,
M represents Al, Ga, In, Si, Ge or Sn,
X's may be identical or different, and each represents an alkyl group which may have a substituent, an aryl group which may have a substituent, a heteroring moiety which may have a substituent, a phthalimidomethyl group which may have a substituent, a halogen atom, a nitro group, a cyano group, a sulfonic acid group, $-OR^1$, $-SR^2$, $-COOR^3$,

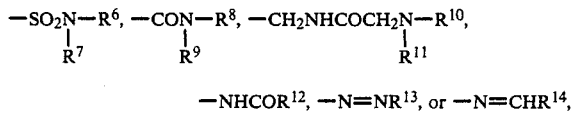

in which

R¹ to R¹¹ may be identical or different, and each represents a hydrogen atom, an alkyl group which may have a substituent, an aryl group which may have a substituent, an acyl group which may have a substituent, a cycloalkyl group which may have a substituent, or a polyether group which may have a substituent, or R⁶ and R⁷, R⁸ and R⁹ or R¹⁰ and R¹¹ may form a four to seven-membered heteroring, and these four to seven-membered ring may further contain a nitrogen atom, oxygen atom or sulfur atom, and R¹², R¹³ and R¹⁴ may be identical or different, and each represents an alkyl group which may have a substituent, a cylcoalky group which may have a substituent, or an aryl group which may have a substituent,

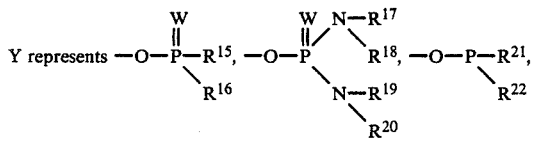

or —O—Se—R²³, and Z represents hydrogen, a halogen atom, a hydroxyl group, an alkyl group which may have a substitutent,

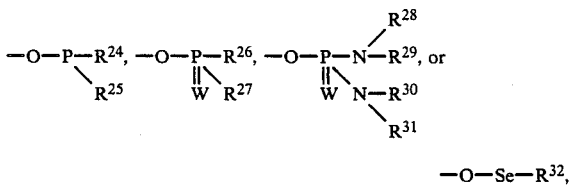

in which R¹⁵, R¹⁶, R²¹, R²², R²³, R²⁴, R²⁵, R²⁶, R²⁷ and R³² may be identical or different, and each represents an alkyl group which may have a substituent, an aryl group which may have a substituent, an acyl group which may have a substituent, a cycloalkyl group which may have a substituent, an alkoxy group which may have a substituent, an aryloxy group which may have a substituent, a polyether group which may have a substituent, a hydroxyl group, or a halogen atom, and in which R¹⁷, R¹⁸, R¹⁹, R²⁰, R²⁸, R²⁹, R³⁰ and R³¹ may be identical or different, and each represents an alkyl group which may have a substituent, an aryl group which may have a substituent, an acyl group which may have a substituent, a cycloalkyl group which may have a substituent, an alkoxy group which may have a substituent, an aryloxy group which may have a substituent, a polyether group which may have a substituent, a hydroxyl group, a halo-gen atom or a hydrogen atom, and W represents O, S, Se or Te, k, l, m and n each independently represent an integer of 0 to 8, and p represents 0 or 1.

2. An optical recording medium according to claim 1 wherein all of the rings A' to A' are naphthalene rings.

3. An optical recording medium according to claim 1 wherein M is Si or Ge.

4. An optical recording medium according to claim 1 wherein X is a linear or branched alkyl group having 1 to 18 carbon atoms.

5. An optical recording medium according to claim 1 wherein X is a phthalimidomethyl group.

6. An optical recording medium according to claim 1 wherein k, l, m and n amount to 4 to 6 in total.

7. An optical recording medium according to claim 1 wherein each of Y and Z is a diphenylphosphinoxy group represented by the formula

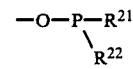

wherein R²¹ and R²² each represent a phenyl group.

8. An optical recording medium according to claim 3 wherein each of Y and Z is a diphenylphosphinoxy group represented by the formula

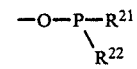

wherein R²¹ and R²² each represent a phenyl group.

9. An optical recording medium according to claim 7 wherein A¹ to A⁴ each are naphthalene.

10. An optical recording medium according to claim 9 wherein X is a linear or branched alkyl group having 1 to 18 carbon atoms.

11. An optical recording medium according to claim 9 wherein X is a phthalimidomethyl group.

12. An optical recording medium according to claim 10 wherein the phthalocyanine compound is a silicon-naphthalocyanine compound in which each of K, l, m and n is 1.

13. An optical recording medium according to claim 12 wherein the siliconnaphthaocyanine compound has 1 to 2 halogen atoms.

14. A process for the production of an optical recording medium, which comprises dissolving at least one phathalocyanine compound recited in claim 1 in an aliphatic hydrocarbon having at least one unsaturated bond, coating the resultant solution on a transparent substrate, and drying the resultant coating to form a recording film.

15. A process according to claim 14 wherein the aliphatic hydrocarbon is at least one aliphatic hydrocarbon selected from a group consisting of alkenes, cycloalkenes, alkynes, cycloalkynes and these with a hydroxyl group in their skeleton.

16. A process according to claim 14 wherein the phthalocyanine compound is that in which each of rings A¹ to A⁴ is a naphthalene ring and each of Y and Z is a diphenylphosphinoxy group represented by the formula

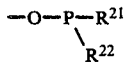

wherein $R^{21}$ and $R^{22}$ each represent a phenyl group.

17. A process according to claim 15 wherein the phthalocyanine compound is that in which each of rings $A^1$ to $A^4$ is a naphthalene ring and each of Y and Z is a diphenylphosphinoxy group represented by the formula

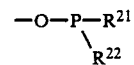

wherein $R^{21}$ and $R^{22}$ each represent a phenyl group.

18. A process according to claim 14 wherein the transparent substrate is formed of a polycarbonate resin.

* * * * *